United States Patent
Carrel et al.

(10) Patent No.: US 11,381,386 B2
(45) Date of Patent: Jul. 5, 2022

(54) SECURE NETWORK COMMUNICATION

(71) Applicant: Cisco Technology, Inc., San Jose, CA (US)

(72) Inventors: David Mark Carrel, Tiburon, CA (US); Venugopal Hemige, San Ramon, CA (US); Praveen Raju Kariyanahalli, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 328 days.

(21) Appl. No.: 16/021,427

(22) Filed: Jun. 28, 2018

(65) Prior Publication Data

US 2019/0140826 A1 May 9, 2019

Related U.S. Application Data

(60) Provisional application No. 62/539,380, filed on Jul. 31, 2017.

(51) Int. Cl.
*H04L 9/08* (2006.01)
*H04L 9/40* (2022.01)
*H04L 9/14* (2006.01)

(52) U.S. Cl.
CPC .......... *H04L 9/0827* (2013.01); *H04L 9/0825* (2013.01); *H04L 9/0891* (2013.01);
(Continued)

(58) Field of Classification Search
CPC ... H04L 9/0827; H04L 9/0825; H04L 9/0891; H04L 9/14; H04L 63/0442; H04L 63/062
(Continued)

(56) References Cited

U.S. PATENT DOCUMENTS 6,463,151 B1 * 10/2002 Litsuka ............. H04L 12/40058
380/201
9,124,565 B2 * 9/2015 Soppera ................ H04L 63/062
(Continued)

FOREIGN PATENT DOCUMENTS

EP        2282442 A1    2/2011

OTHER PUBLICATIONS

International Search Report and Written Opinion from the International Searching Authority, dated Oct. 10, 2018, 11 pages, for the corresponding International Patent Application No. PCT/US2018/043619.

*Primary Examiner* — Shewaye Gelagay
*Assistant Examiner* — Moeen Khan
(74) *Attorney, Agent, or Firm* — Polsinelli PC

(57) ABSTRACT

A method may include transmitting a first public encryption key from to a control device and encrypting a first packet for a remote network device utilizing a first private encryption key correlated with the first public encryption key. The method may also include generating a second public encryption key and a second private encryption key and transmitting the second public encryption key to the control device. The method may additionally include receiving a first message from the remote network device that the remote network device received the second public encryption key from the control device, and after receiving the first message from the remote network device that the remote network device received the second public encryption key, encrypting a second packet utilizing the second private encryption key.

18 Claims, 9 Drawing Sheets

(52) U.S. Cl.
CPC ............ *H04L 9/14* (2013.01); *H04L 63/0442* (2013.01); *H04L 63/062* (2013.01)

(58) Field of Classification Search
USPC ........................................................ 713/153
See application file for complete search history.

(56) References Cited

U.S. PATENT DOCUMENTS

| | | | |
|---|---|---|---|
| 2007/0076886 A1* | 4/2007 | Hori ...................... | H04L 63/068 380/277 |
| 2008/0022101 A1* | 1/2008 | Sung ..................... | H04L 9/0825 713/171 |
| 2009/0215477 A1 | 8/2009 | Lee et al. | |
| 2010/0091993 A1* | 4/2010 | Iwama .................. | H04L 9/0891 380/273 |
| 2011/0274277 A1* | 11/2011 | Hennebert .......... | H04L 63/0442 380/273 |
| 2016/0149899 A1 | 5/2016 | Abbott | |

* cited by examiner

SECURE NETWORK COMMUNICATION

CROSS REFERENCE TO RELATED APPLICATIONS

This application claims priority to U.S. Patent App. No. 62/539,380, filed on Jul. 31, 2017, which is hereby incorporated by reference in its entirety.

FIELD

The embodiments discussed in the present disclosure are related to secure network communication.

BACKGROUND

The use of networks is a useful tool in allowing communication between distinct computing devices. Some devices in network communications use encryption keys to encrypt packets back and forth with other devices. For example, a first network device may use a private version of its own encryption key and a public version of a second network device's encryption key to encrypt a packet. Conversely, the second network device may use a private version of its own encryption key that corresponds to the public version used by the first network device, and a public version of an encryption key that corresponds to the first network device's private encryption key. Using such an approach, both network devices may arrive at the same secret key for communicating. Those encryption keys may be periodically updated to enhance security.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure include a method that includes transmitting a first public encryption key from a local network device to a control device. The method additionally includes encrypting a first packet for a remote network device utilizing a first private encryption key correlated with the first public encryption key and generating a second public encryption key and a second private encryption key. The method also includes transmitting the second public encryption key from the local network device to the control device and receiving a first message from the remote network device at the local network device that the remote network device received the second public encryption key from the control device. The method additionally includes, after receiving the first message from the remote network device that the remote network device received the second public encryption key, encrypting a second packet utilizing the second private encryption key.

One or more embodiments of the present disclosure may additionally include systems and/or non-transitory computer readable media for facilitating the performance of such methods, such as a system with the control device, the remote network device, and the local network device.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
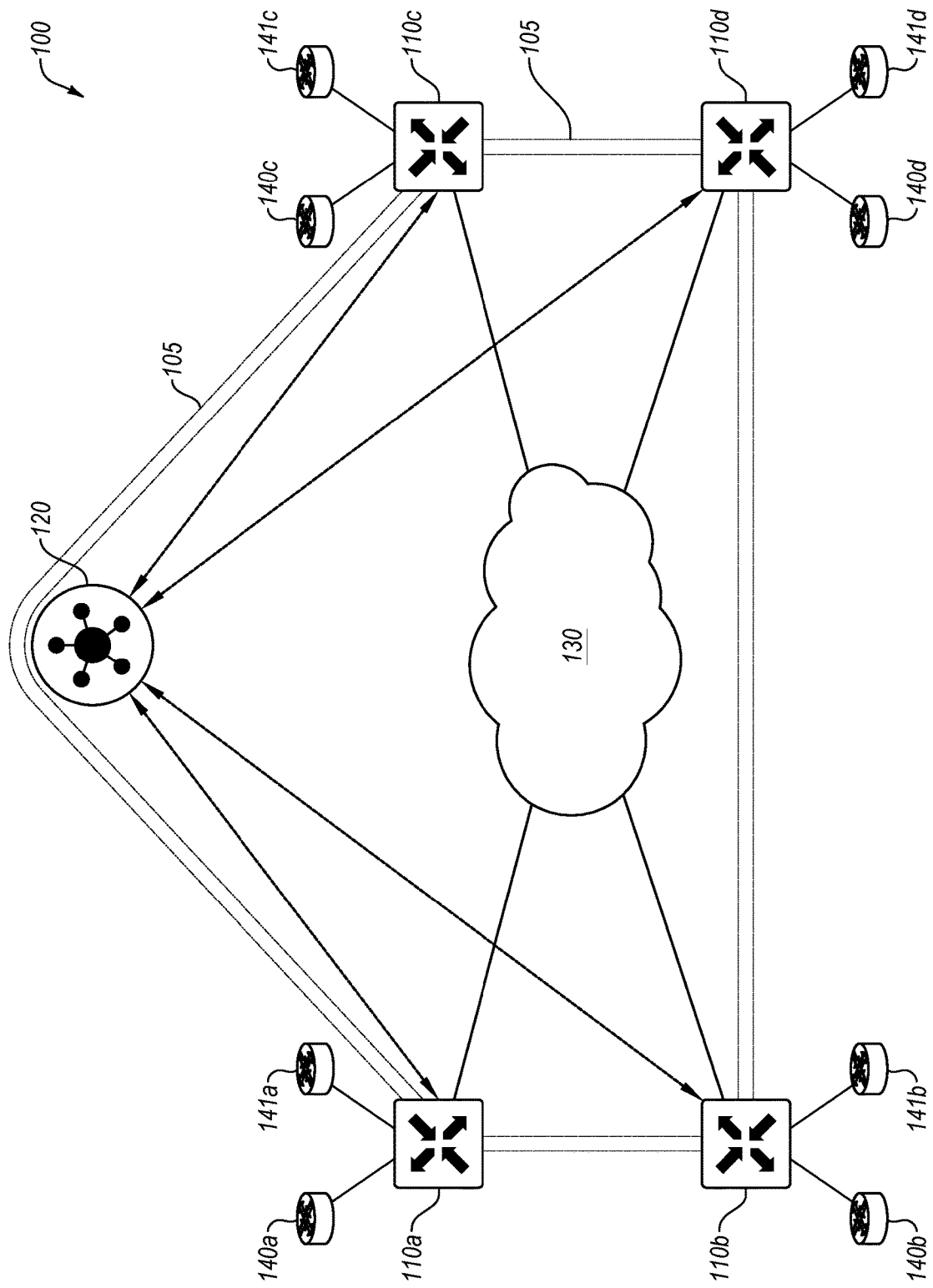
FIG. 1 illustrates an example system of network components implementing a software-defined network.

Some embodiments of the present disclosure relate to, inter alia, approaches to implementing secured public/private encryption keys in a software defined network. In particular, most security protocols, such as Internet protocol Security (IPsec), utilize a communication session between two network devices to exchange public encryption keys and then establish a secure communication session. Furthermore, if one of the network devices generates an updated key during the session, the network device updating the key sends the updated key to the other network device. However, such an approach to updating keys introduces complexity and uncertainty in embodiments with a centralized control device that distributes the public encryption keys. For example, if a first and second network device are communicating, and the first network device generates a new set of encryption keys, the new public encryption key may be sent to the centralized control device rather than directly to the second network device. The first network device may not be aware of when the second network device actually receives the newly generated public encryption key. While the first network device could simply send the newly generated key, such an approach, when amplified over a large network, would introduce burdensome network traffic and overhead in communicating the newly generated public encryption keys. This problem is only exacerbated with increased security that may include updating keys more frequently, such as multiple times a day.

Following the example from above, the first network device may wait to begin encrypting packets using the newly generated encryption keys until the first network device receives a message from the second network device that the second network device has received the new public encryption key from the centralized control device. In some embodiments, that message may include a header indicating what version of the public encryption key was used to encrypt that particular packet. Using such a message, the first network device will know when the second network device has received the updated key, because the first network device will receive a packet that was encrypted with the new pubic encryption key and has a header indicating that it was encrypted using that new public encryption key.

However, the complexity is further increased and the potential for increased communication problems are introduced because both network devices can update their respective keys during the communication session. In such a circumstance, both network devices will need to know which version of public and private keys to use based on which keys have or have not been received by the other network device. In some embodiments, the header of the packet may indicate which version of each key pair (e.g., which public encryption key and which private encryption key) were used to encrypt the packet.

Embodiments of the present disclosure may provide improvements to computer networks and to the operation of computers themselves. For example, using one or more embodiments of the present disclosure, network traffic may flow with increased performance preserving valuable network resources such as bandwidth and providing increased response times. Additionally, the amount of traffic flowing through the internal network domain may be reduced, providing superior performance for the internal network domain. For example, rather than each network device communicating with each other network device in a network regarding an updated public key, the updating network device may communicate directly with a centralized control device, which may then periodically distribute the public keys. Additionally, such an approach as described herein may improve security within the network, as encryption keys may be updated regularly, and each pair of communicating network devices may utilize both public and private keys.

Embodiments of the present disclosure are explained with reference to the accompanying drawings.

FIG. 1 illustrates an example system 100 of network components implementing a software-defined network, in accordance with one or more embodiments of the present disclosure. The system 100 may include an internal network domain 105 and one or more external network domains. The system 100 may include one or more edge network devices 110 (such as the edge network devices 110*a*-110*d*), a control device 120, a communication network 130, and external network devices 140 and 141 (such as the external network devices 140*a*-140*d* and 141*a*-141*d*).

The system 100 may implement a software-defined network. A software-defined network may include a network that is managed by software rather than controlled by hardware. As such, a software-defined network may support multiple types of connections, such as the Internet, Multi-Protocol Label Switching (MPLS) connections, and/or cellular connections (such as Long Term Evolution (LTE), LTE Advanced, Worldwide Interoperability for Microwave Access (WiMAX), Evolved High Speed Packet Access (HSPA+), and/or others). Additionally, a software-defined network may support load balancing or load sharing between the various connections. Further, because of the distributed nature of a network, a software defined network may support virtual private networks (VPNs), firewalls, and other security services. In a software-defined network, for example, a control plane may be functionally separated from the physical topology. In some embodiments, a software-defined network may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, a software-defined network may be implemented as a software-defined wide area network (SD-WAN), local area network (LAN), metropolitan area network (MAN), among others. While one or more embodiments of the present disclosure may be described in the context of an SD-WAN, such embodiments may also be implemented in any software-defined network.

In some embodiments, the control device 120 may be configured to manage the control plane of an internal network domain 105 by directing one or more aspects of the operation of the edge network devices 110. For example, the control device 120 may generate and/or distribute policies to one or more of the edge network devices 110. A policy may include a rule or set of rules bearing on the handling of network traffic, such as routing, priority, media, etc. The internal network domain 105 may operate as a secured and controlled domain with specific functionality and/or protocols. In some embodiments, the edge network devices 110 may operate based on one or more policies created and/or propagated by the control device 120. In these and other embodiments, the edge network devices 110 may route data traffic within the internal network domain 105 based on the policies created and/or propagated by the control device 120.

In some embodiments, the control device 120 may form a control plane connection with each of the edge network devices 110. The control plane connection may facilitate the exchange of data between the edge network devices 110 and the control device 120 for management and control of the internal network domain 105. The control plane connection may operate as a tunnel through the communication network 130, such as a Datagram Transport Layer Security (DTLS) tunnel. In some embodiments, data transmitted over the control plane connection may facilitate the control device 120 determining topology of the communication network 130. For example, the control device 120 may communicate with the edge network devices 110 to determine what physical connections exist between and among the edge network devices 110 in the communication network 130. Additionally, or alternatively, data transmitted over the control plane connection may facilitate the control device 120 determining optimal or desired paths across the communication network 130 between and among the edge network devices 110. Additionally, or alternatively, the control device 120 may communicate route information to the edge network devices 110 over the control plane connection. In these and other embodiments, the control plane connection may include a permanent connection between the control device 120 and the edge network devices 110 such that if the connection between the control device 120 and a given edge network device 110 is broken, the edge network device 110 may be unable or otherwise disallowed from communicating over the internal network domain 105.

In some embodiments, the control device 120 may maintain a central route table that stores route information within the internal network domain 105. For example, the control device 120 may communicate with various edge network devices 110 to determine the physical connections available to the edge network devices 110 through the communication network 130. In some embodiments, the edge network devices 110 may include one or more physical connections to each other. In these and other embodiments, the control device 120 may generate and/or update one or more policies in conjunction with the central route table to determine data traffic routes through the internal network domain 105 and may communicate those data traffic routes to the edge network devices 110. In at least one embodiment, the control device 120 may provide policies and other categorical rules related to traffic flows to the edge network devices 110 rather than being involved with every individual flow through the internal network domain 105.

In these and other embodiments, the edge network devices 110 may not have stored the topology and/or route paths of the entire system 100. Each of the edge network devices 110 may not need to query each other individually to determine reachability. Instead, the control device 120 may provide such information to the edge network devices 110. Additionally, or alternatively, a subset of the reachability and/or infrastructure information may be provided to the edge network devices 110, for example, based on one or more policies of the control device 120. In these and other embodiments, the control device 120 may route traffic through a most direct route, or through some other route based on one or more other policies of the control device 120.

In some embodiments, the one or more policies may include guidance regarding determining next-hop instructions. For example, a particular policy may instruct a particular edge network device 110 where to route the traffic next for a particular category, class, or group of traffic flows, rather than providing a complete end-to-end route for the traffic. For example, the edge network device 110a may receive data from an external network device 140a directed to an address of the external network device 141c. The edge network device 110a may have stored a first policy that includes a first traffic data route from the control device 120 indicating that a "next-hop" for network traffic destined for the address of the external network device 141c is to be routed to the edge network device 110d. The first traffic data route may indicate what connection or connections the edge network device 110a may use to route the traffic to the edge network device 110d. The edge network device 110d may have stored a second policy that includes a second traffic data route from the control device 120 indicating that a "next-hop" for network traffic destined for the address of the external network device 141c may be routed to the edge network device 110c. The second traffic data route may indicate what connection or connections the edge network device 110d may use to route the traffic to the edge network device 110c. The edge network device 110c may receive the data and may route the data to the external network device 141c with or without using a policy to arrive at this routing decision.

In addition to generating policies to guide the edge network devices 110 in making routing decisions, the control device 120 may generate policies that are to be followed by the edge network devices 110. In some embodiments, the control device 120 may generate policies to cause certain network traffic flows within the internal network domain 105 to be routed over certain types of connections (e.g., LTE, MPLS) and/or through certain edge network devices 110. For example, the control device 120 may check the central route table and determine that a direct connection exists between the edge network device 110a and the edge network device 110c. Rather than allowing data to be routed directly between the edge network device 110a and the edge network device 110c, the control device 120 may generate a policy to instead cause the data to be routed through the edge network device 110d. For example, the data may be routed through the edge network device 110d for various reasons, such as because the edge network device 110d may include a firewall, data filter, security feature, data loss prevention (DLP) feature, export control, or government compliance feature, among others. As another example, the control device 120 may generate a policy to cause one or more of the edge network devices 110 to route traffic through an edge network device 110 associated with a data center, for example, because the data center includes a firewall, data filter, etc. Using such an approach, the flow of traffic within the internal network domain 105 may be readily controlled and guided based on policies and traffic routes propagated by the control device 120 to the edge network devices 110.

In some embodiments, the control device 120 may receive one or more keys from the edge network devices 110 used in communication of data over the data plane. For example, one or more data packets may utilize one or more keys for security purposes in transmitting data from one edge network device 110 to another edge network device 110. In these and other embodiments, the control device 120 may reflect the received keys to one or more other edge network devices 110 that may be in the traffic flow based on the central route table and/or the policies implemented by the control device 120. For example, the control device 110 may receive a key, such as a public key, from a given edge network device 110 and may rebroadcast or otherwise transmit the key to the other edge network devices 110. For example, the control device 110 may periodically broadcast a current version of public key for each edge network device 110 to the other edge network devices 110. The frequency with which the control device 120 may distribute the keys may be based on a frequency with which the edge network devices 110 generate new keys.

In these and other embodiments, a given edge network device 110 may generate a private key and a public key to facilitate secure communication between edge network devices. In these and other embodiments, a set of associated private and public keys may be generated by the given edge network device 110, with the private key remaining with the given edge network device 110 and the public key provided to the control device 120 such that the control device 120 may distribute the public key to other edge network devices that communicate with the given edge network device 110. In such a way, each edge network device that is to communicate with the given edge network device 110 based on the policies of the control device 120 may receive the public key. Furthermore, the internal network domain 105 may eliminate the network traffic of each edge network device 110 sending its updated public key to every other edge network device 110.

In some embodiments, traffic within the internal network domain 105 may be encrypted with an encryption scheme, such as various encryption standards or keys. For example, the internal network domain 105 may utilize two-way authentication using Advanced Encryption Standard (AES) with a 256-bit length key over one or more Datagram Transport Layer Security (DTLS) and/or Transport Layer Security (TLS) connections between edge network devices 110.

In some embodiments, the control device 120 may store authentication information for one or more (or all) of the edge network devices 110 within the internal network domain 105. In these and other embodiments, a device may be prevented from communicating within the internal network domain 105 unless the device has authentication information that matches or otherwise corresponds to the stored authentication information of the control device 120. In some embodiments, the authentication information may be used when the edge network devices 110 first come on line to establish the control plane connection, and any device without a control plane connection with the control device 120 may be prevented from communicating within the internal network domain 105.

The edge network devices 110 may operate at a boundary of the internal network domain 105. The edge network devices 110 may include one or more physical and/or logical connections that may operate within the internal network domain 105. Such connections may be illustrated as part of the communication network 130. Additionally, or alternatively, the edge network devices 110 may include one or more physical and/or logical connections operating outside of the internal network domain 105. For example, the edge network devices 110 may be connected to the external network device(s) 140 and/or 141.

In some embodiments, the edge network devices 110 may operate to route traffic from associated external network devices 140 and 141 into the internal network domain 105. Additionally, or alternatively, the edge network devices 110 may operate to route traffic from the internal network domain 105 to the associated external network devices 140 and 141. In some embodiments, the edge network devices 110 may communicate with associated external network devices 140 and 141 using typical communication protocols, such as Open Shortest Path First (OSPF), Border Gateway Protocol (BGP), Virtual Router Redundancy Protocol (VRRP), and Bi-directional Forwarding Detection (BFD), among others. Additionally, or alternatively, the edge network devices 110 may support other network functionalities such as Virtual Local Area Network (VLAN) tagging, Quality of Service (QoS) monitoring, Service Level Agreements (SLA), Internet Protocol (IP) forwarding, Internet Protocol Security (IPsec), Access Control Lists (ACL), among others.

For example, with VLAN tagging, the edge network devices 110 may be configured to insert a VLAN tag into a packet header. Such a VLAN tag may identify one VLAN of multiple VLANs to which a network traffic packet belongs. Based on the VLAN tag, the edge network devices 110 may route the network traffic packet to one or more port(s) associated with the VLAN.

As another example, with QoS monitoring, the edge network devices 110 may provide for one or more QoS metrics that may be monitored, such as jitter, bandwidth, error rate, bit rate, throughput, and/or others.

As an additional example, with SLAs, the edge network devices 110 may include an agreed upon threshold level for one or more QoS metrics, such as bandwidth, availability, jitter, and/or others. In these and other embodiments, a given edge network device 110 may be configured to adjust or otherwise modify one or more properties of how the given edge network device 110 handles or routes traffic to better comply with one or more SLAs. For example, the traffic flow for one application may be throttled so that the traffic flow for another application may comply with a corresponding SLA.

As another example, with IP forwarding, the edge network devices 110 may include one or more protocols that may be utilized to route packets in an IP network. For example, such a protocol may take into account factors such as packet size, services specified by a header, characteristics of potential links to other routers in the network, and/or others. Utilizing such factors, the edge network devices 110 may forward packets based on a selected algorithm, such as a shortest path.

As an additional example, with IPsec, the edge network devices 110 may utilize IPsec to authenticate and/or encrypt network traffic. For example, a given edge network device 110 may authenticate one or more computing devices to communicate with the given edge network device 110 and/or encrypt one or more packets communicated between the computing device and the given edge network device 110.

As another example, with ACLs, the edge network devices 110 may include a set of rules indicative of one or more addresses, hosts, and/or networks that may be permitted to use a given port. In these and other embodiments, the edge network devices 110 may include ACLs that are applicable to inbound traffic, outbound traffic, or both.

In some embodiments, the edge network devices 110 may locally maintain one or more local route tables. In some embodiments, the edge network devices 110 may adjust or modify the local route tables based on one or more policies sent from the control device 120. For example, one or more entries may be removed, discarded, or otherwise not added to the local route tables by the edge network devices 110 based on the one or more policies. In some embodiments, the edge network devices 110 may include logic to update, modify, and/or generate the local route tables based on traffic handled by the edge network devices 110. The one or more local route tables may be automatically populated by the edge network devices 110 based on direct interface routes, static routes, and/or dynamic routes learned using one or more network protocols such as BGP and/or OSPF. In some embodiments, routing decisions for data outside of the internal network domain 105 may be performed by a particular edge network device 110 without specific direction, input, or control from the control device 120. For example, the particular edge network device 110 may compute a routing decision based on the one or more policies that the particular edge network device 110 has received from the control device 120 and/or with reference to the local route table of the particular edge network device 110.

In some embodiments, by separating the routing decisions for data outside of the internal network domain 105 from those within the internal network domain 105, the system 100 may include multiple segments that may be handled based on the policies from the control device 120. In these and other embodiments, the multiple segments may correspond to multiple VPNs that may be handled separately using the same internal network domain 105. For example, an accounting department may include one VPN and the rest of an organization may be on another VPN. As another example, an original business entity may be on one VPN and a business entity newly acquired by the original business entity may be on a separate VPN. For example, the external network devices 140a-140d may be in a first VPN with a first prefix that may identify data packets associated with the first VPN, and the external network devices 141a-141d may be in a second VPN with a second prefix associated with the second VPN. In these and other embodiments, a given edge network device 110 may provide any prefixes learned by the given edge network device 110 to the control device 120. For example, the edge network device 110a may query, learn, or otherwise obtain the first prefix of the first VPN associated with the external network device 140a and the second prefix of the second VPN associated with the external network device 141a. The edge network device 110a may transmit the first and the second prefixes to the control device 120. In these and other embodiments, the control device 120 may provide received prefixes to one or more of the edge network devices 110. For example, the prefixes received from the edge network device 110a may be communicated from the control device 120 to the edge network devices 110b-110d.

In some embodiments, one or more of the edge network devices 110 and/or the control device 120 may be implemented as one or more virtual machines operating on one or more physical computing devices. Additionally or alternatively, the edge network devices 110 and/or the control device 120 may each include an individual stand-alone computing device.

Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

FIGS. 2-5 illustrate various swim lane diagrams 200, 300, 400, and 500, respectively, of examples embodiments of network communication, in accordance with one or more embodiments of the present disclosure. The diagram 200 illustrates one embodiment of utilizing an updated encryption key during a secure communication session, the diagram 300 illustrates another embodiment of utilizing an updated encryption key during a secure communication session, the diagram 400 illustrates an embodiment of two network devices both updating encryption keys during a secure communication session, and the diagram 500 illustrates another embodiment of two network devices both updating encryption keys during a secure communication session.

With reference to FIGS. 2-5, the diagrams 200-500 include first network devices 210a, 310a, 410a, and 510a and second network devices 210b, 310b, 410b, and 510b. The first and second network devices may be any network device, for example, being similar or comparable to the edge network devices 110 of FIG. 1. The network devices may be implemented as a computing system 900 of FIG. 9 and/or a virtual machine operating on a physical computing system 900. The diagrams 200-500 may include control devices 220, 320, 420, and 520. The control devices may be similar or comparable to the control device 120 of FIG. 1. The diagrams 200-500 may illustrate various communications among or between the network devices and the control devices. The vertical flow from top to bottom may illustrate chronological events.

Figure 2:
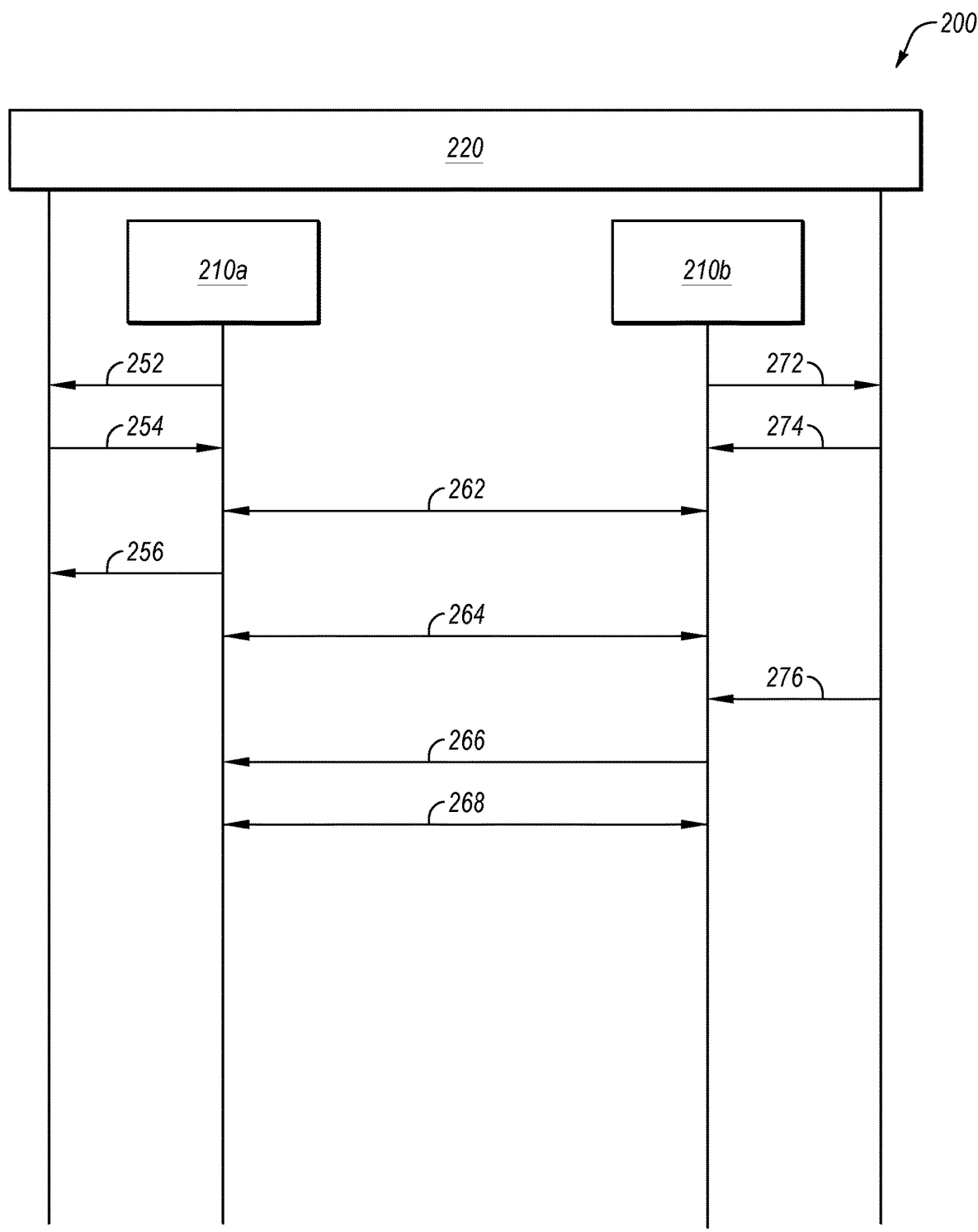
FIGS. 2-5 illustrate various swim lane diagrams of examples embodiments of network communication.

With reference to FIG. 2, at 252 the first network device 210a transmits a first public encryption key associated with a private encryption key to the control device 220. At 272, the second network device 210b transmits a third public encryption key associated with a third private encryption key to the control device 220. Periodically, the control device 220 may transmit public encryption keys to various network devices, including the first and second network devices 210a and 210b. At 254, the first network devices 210a receives the third public encryption key from the control device 220. At 274, the second network device 210b receives the first public encryption key from the control device 220. Thus, to communicate securely using their respective public/private encryption key pairs, the first network device 210a and the second network device 210b may communicate without exchanging public keys. Rather, at 262, the first network device 210a may encrypt packets for the second network device 210b using the first private encryption key and the third public encryption key. Similarly, at 262, the second network device 210b may encrypt packets for the first network device 210a using the third private encryption key and the first public encryption key.

Between 262 and 256, the first network device 210a may generate a second public and private encryption keys that are to eventually replace the first public and private encryption keys. For example, after both the first network device 210a and the second network device 210b have stored the second private and public encryption keys, respectively, the first and second network devices 210a and 210b may utilize the second public and private encryption keys to encrypt packets.

At 256, the first network device 210a may transmit the second public encryption key to the control device 220. At 264, the first network device 210a and the second network device 210b may continue to encrypt packets for communication using the first public and private encryption keys rather than using the second public and private encryption keys. At 276, the control device may communicate the second public encryption key to the second network device 210b, for example, based on a periodic distribution of public encryption keys.

At 266, in response to receiving the second public encryption key from the control device 220, the second network device 210b may send a message to the first network device 210a indicating that the second network device 210b has received the updated second public encryption key from the control device 220. For example, the second network device 210b may encrypt a packet and may include a header for the encrypted packet with one or more bits identifying what version of public encryption key was used to encrypt the packet, such as the first public encryption key before receiving the second public encryption key and indicating the second public encryption key after receiving the second public encryption key. In these and other embodiments, the header may additionally identify which version of private encryption key of the second network device 410b was used to encrypt the packet. For example, the header may include a SPI in accordance with IPsec. Additionally, or alternatively, the message may include a dedicated packet such as an acknowledgment packet or other indicator that the second network device 410b has received the second public encryption key.

After the first network device 210a receives the message from the second network device 210b, the first network device 210a encrypts packets for the second network device 210b utilizing the second private encryption key and the third public encryption key. The second network device 210b encrypts packets for the first network device 210a utilizing the third private encryption key and the second public encryption key.

With reference to FIGS. 3, 352, 354, 356, 362, 364, 366, 372, 374, and 376 are similar or comparable to 252, 254, 256, 262, 264, 266, 272, 274, and 276, and so will not be repeated for sake of clarity.

At 366, the first network device 310a may send a request to the second network device 310b requesting the second network device 310b use the second public encryption key. In some embodiments, the first network device 310a may wait a certain period of time after transmitting the second public encryption key to the control device 320 (356) before sending the request. The certain period of time may be based on how frequently the control device 320 periodically distributes the public encryption keys to the network devices. For example, if the control device 320 distributes public encryption keys every five minutes, the first network device 310a may wait at least five minutes before sending the request such that the first network device 310a knows that the second network device 310*b* has received the second public encryption key from the control device 320. Additionally, or alternatively, the network device 310*a* may periodically send requests and wait to shift over to the second private encryption key until, at 367, the second network device 310*b* responds with an acknowledgment that the second network device 310*b* has received the second public encryption key. In these and other embodiments, the acknowledgment at 367 may be optional such that, if the acknowledgement is not used, in response to sending the request at 366, the first network device 310*a* may begin using the second private encryption key to encrypt packets; and in response to receiving the request at 366, the second network device 310*b* may begin using the second public key to encrypt packets.

At 368, the first network device 310*a* and the second network device 310*b* may encrypt packets using the second private and public encryption keys, respectively.

Figure 4:
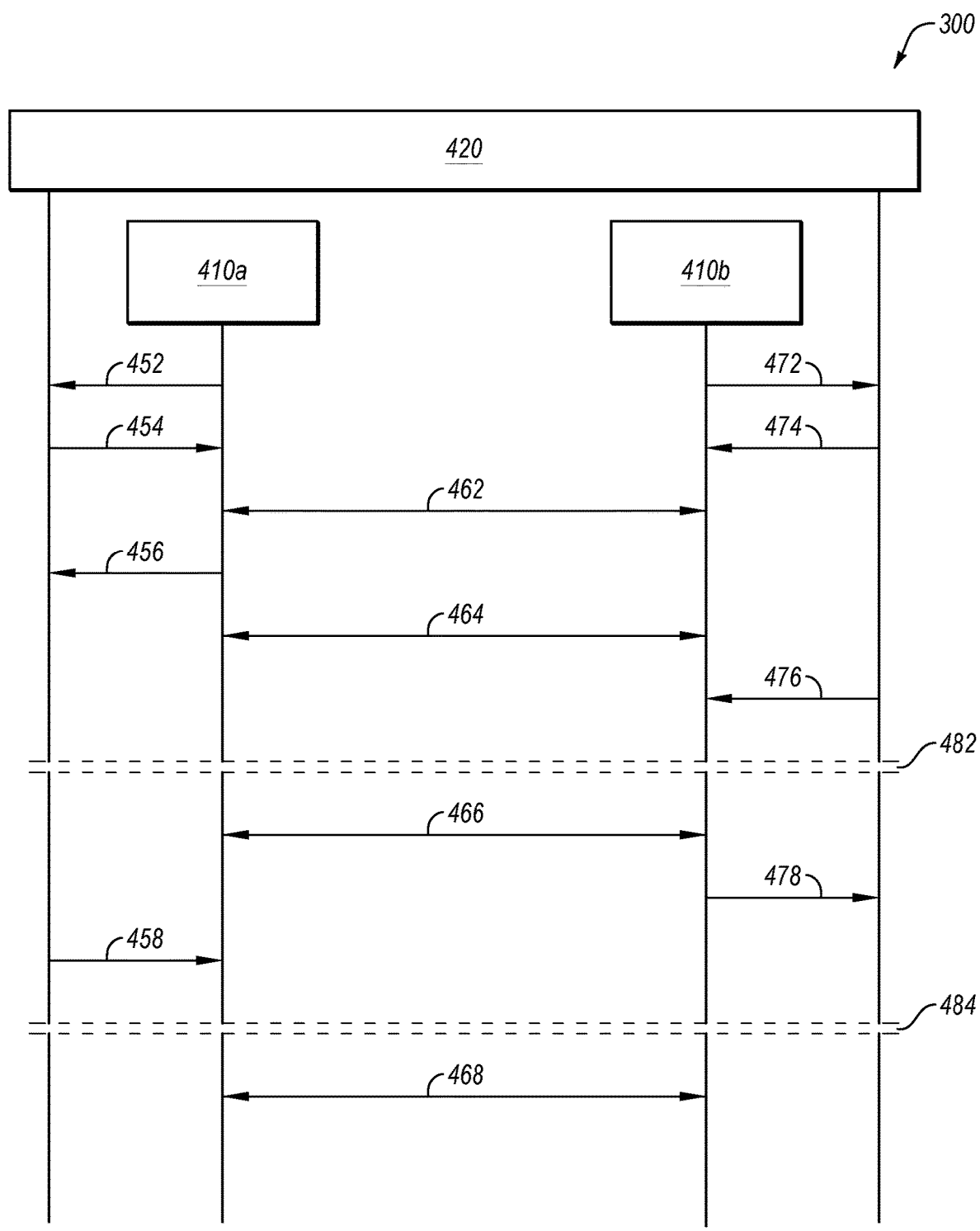
Figure 5:
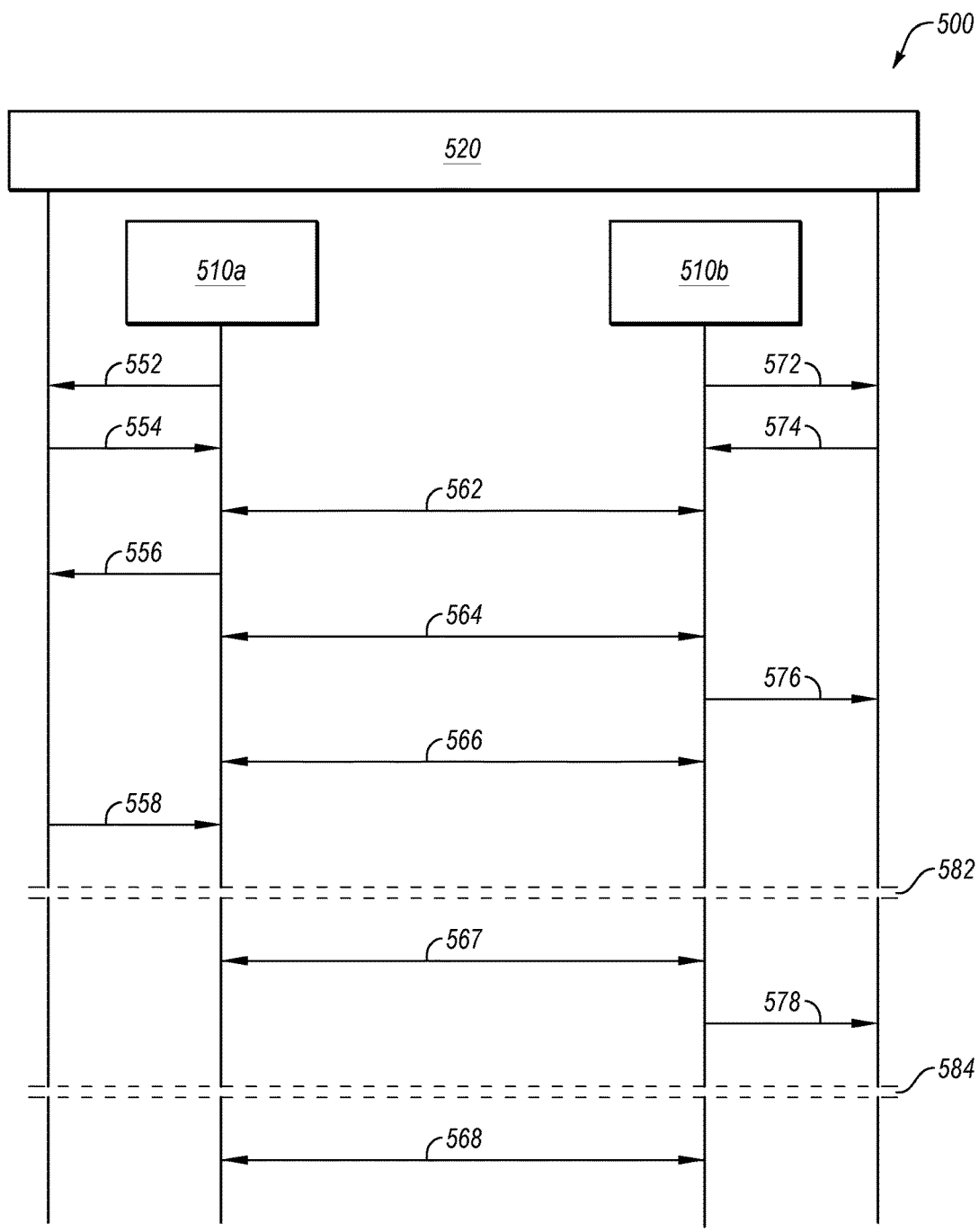

With reference to FIGS. 4, 452, 454, 456, 462, 464, 472, 474, and 476 are similar or comparable to 252, 254, 256, 262, 264, 272, 274, and 276, and so will not be repeated for the sake of clarity. FIGS. 4 and 5 illustrate various issues of complexity that may be introduced as both the first network device 410*a* and the second network device 410*b* may update encryption keys.

Figure 3:
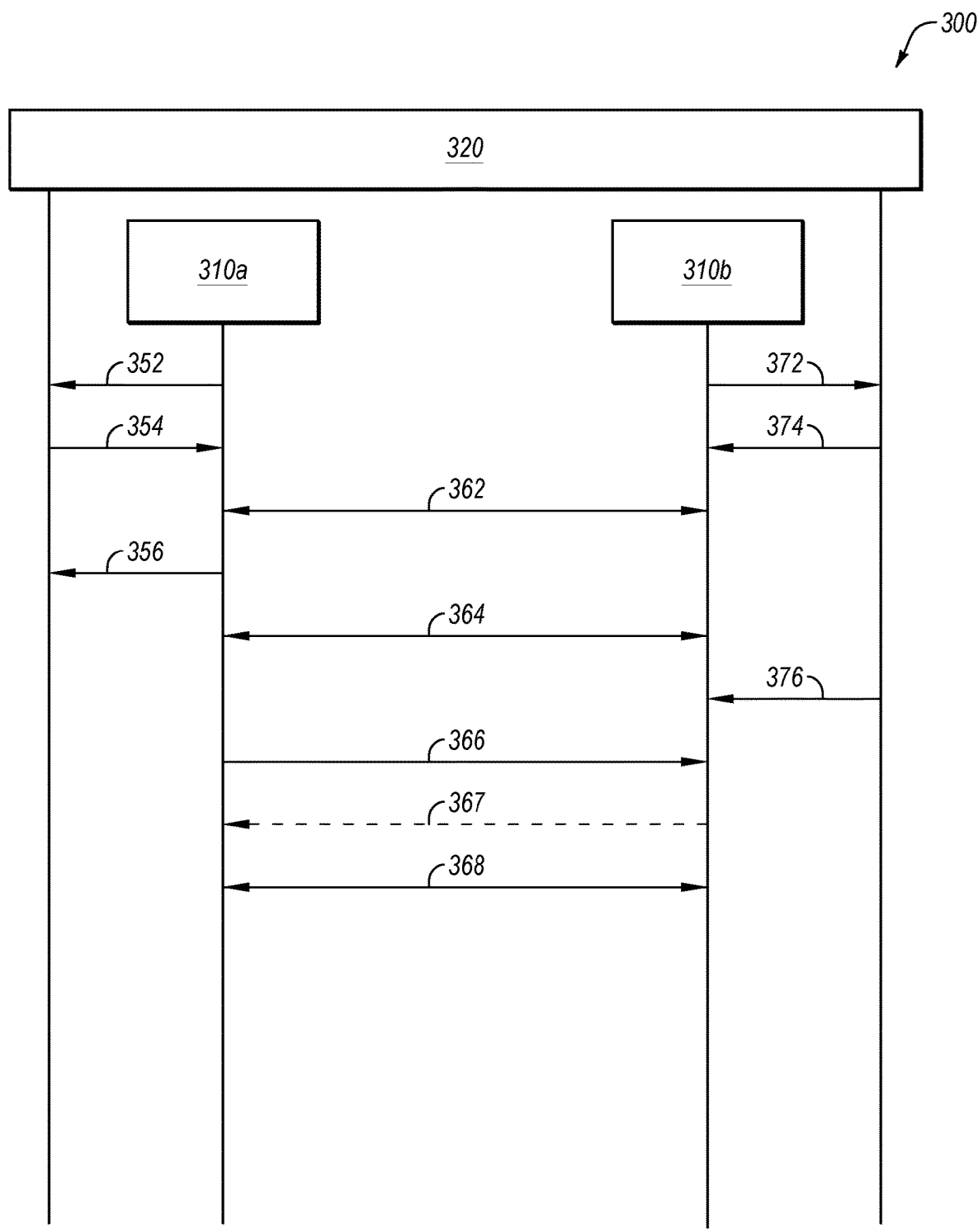

At 482, the first network device 410*a* and the second network device 410*b* transition to encrypting packets utilizing the second private and public encryption keys, respectively, using any approach, such as those disclosed in FIGS. 2 and 3.

At 466, the first network device 410*a* may encrypt packets utilizing the second private encryption key and the third public encryption key and the second network device 410*b* may encrypt packets utilizing the second public encryption key and the third private encryption key.

The second network device 410*b* may generate a new fourth public and private encryption keys to replace the third public and private encryption keys. At 478, the second network device 410*b* may transmit the fourth public encryption key to the control device 420. At 458 the control device 420 may provide the fourth public encryption key to the first network device 410*a*.

At 484, the first network device 410*a* and the second network device 410*b* may transition from utilizing the third public and private encryption keys, respectively, to the fourth public and private encryption keys, respectively, to encrypt packets for secure communication. For example, the first network device 410*a* and the second network devices 410*b* may follow one of the approaches disclosed in FIGS. 2 and 3, but with the roles of the first network device and the second network devices switched. At 468, the first network device 410*a* may encrypt packets using the second private encryption key and the fourth public encryption key, and the second network device 410*b* may encrypt packets using the second public encryption key and the fourth private encryption key.

With reference to FIGS. 5, 552, 554, 556, 562, 564, 572, and 574 are similar or comparable to 252, 254, 256, 262, 264, 272, and 274, and so will not be repeated for the sake of clarity. Additionally, 582 and 584 may be similar or comparable to 482 and 484 of FIG. 4 and so will not be repeated for the sake of clarity.

Between 564 and 576, the second network device 510*b* may generate a fourth public and private encryption keys. At 576, the second network device 510*b* may transmit the fourth public encryption key to the control device 520. At 566, the first network device 510*a* may continue to encrypt packets utilizing the first private encryption key and the third public encryption key and the second network device 510*b* may continue to encrypt packets utilizing the third private encryption key and the first public encryption key, despite both the first and second network devices 510*a* and 510*b* having generated new public and private encryption keys.

At 558, the first network device 510*a* may receive the fourth public encryption key from the control device. At 582, the first network device 510*a* and the second network device 510*b* may transition to utilizing the fourth public encryption key and private encryption key, respectively. At 567, the first network device 510*a* may encrypt packets utilizing the first private encryption key and the fourth public encryption key and the second network device 510*b* may encrypt packets utilizing the first public encryption key and the fourth private encryption key.

At 578, the second network device 510*b* may receive the second public encryption key from the control device. At 584, the first network device 510*a* and the second network device 510*b* may transition to utilizing the second private encryption key and public encryption key, respectively. At 568, the first network device 510*a* may encrypt packets utilizing the second private encryption key and the fourth public encryption key and the second network device 510*b* may encrypt packets utilizing the second public encryption key and the fourth private encryption key.

Modifications, additions, and/or omissions may be made to the diagrams 200, 300, 400, and/or 500 without departing from the scope of the present disclosure. For example, in the diagram 500, the first network device 510*a* and/or the second network device 510*b* may receive the updated encryption keys in any order and the transitions to the updated encryption keys accordingly. As another example, the control device may distribute public encryption keys at any frequency or any duration or may distribute public encryption keys based on a triggering event or an administrator request.

Figure 6:
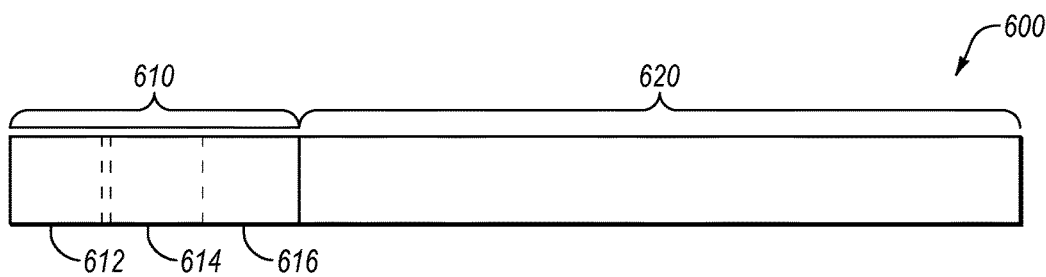
FIG. 6 illustrates an example of a packet identifying an encryption key.

FIG. 6 illustrates an example of a packet 600 identifying an encryption key, in accordance with one or more embodiments of the present disclosure. The packet 600 may include multiple bits that may be readable by a computing device as information. Additionally, the packet 600 may include information for routing within a network, such as the internal network domain 105 of FIG. 1.

The packet 600 may include a header region 610 and a payload region 620. In some embodiments, the header region 610 may include one or more bits that may be used for administrative tasks such as routing, security, protocol identification, etc. and the payload region may include data or other information for a remote computing device.

In some embodiments, the header region 610 may include a first set of bits 612 that may identify a network channel over which the packet is to be communicated. For example, the first set of bits 612 may include a network port through which the packet 600 is to be routed, a transport locator (TLOC) identifying a circuit and/or a transportation medium to be used for routing the packet 600.

The header region 610 may additionally or alternatively include a second set of bits 614 that may identify a first encryption key used in encrypting the packet 600. The header region 610 may also include a third set of bits 616 that may identify a second encryption key used in encrypting the packet 600. For example, if a local network device encrypted the payload portion 620 of the packet 600 using a first private encryption key and a second public encryption key of a remote network device with which the local network device is communicating, the second set of bits 614 may identify the first private encryption key (and an associated first public encryption key) and the second set of bits 616 may identify the second public private encryption key (and an associated second private encryption key). In some embodiments, the second set of bits 614 may include two bits identifying an encryption key version of a local (or a remote) network device. Additionally, or alternatively, the third set of bits 616 may include two bits identifying an encryption key version of a remote (or local) network device. Two bits may permit up to four versions of an encryption key to be identified. For example, if a network device is using a first encryption key and generates a new encryption key, identification between which of the two versions of encryption keys was used may be accomplished via the bits.

In some embodiments, the second and third sets of bits 614 and 616 may be part of a SPI of an IPsec packet. For example, the payload region 620 may be encrypted according to IPsec protocols, and the header region 610 may include the second and third sets of bits 614 and 616 as part of the SPI.

Modifications, additions, or omissions may be made to the packet 600 without departing from the scope of the present disclosure. For example, any number of bits may be used in the header region 610 and/or the payload region 620. As another example, any other sections of bits may be included in the header region 610.

Figure 7:
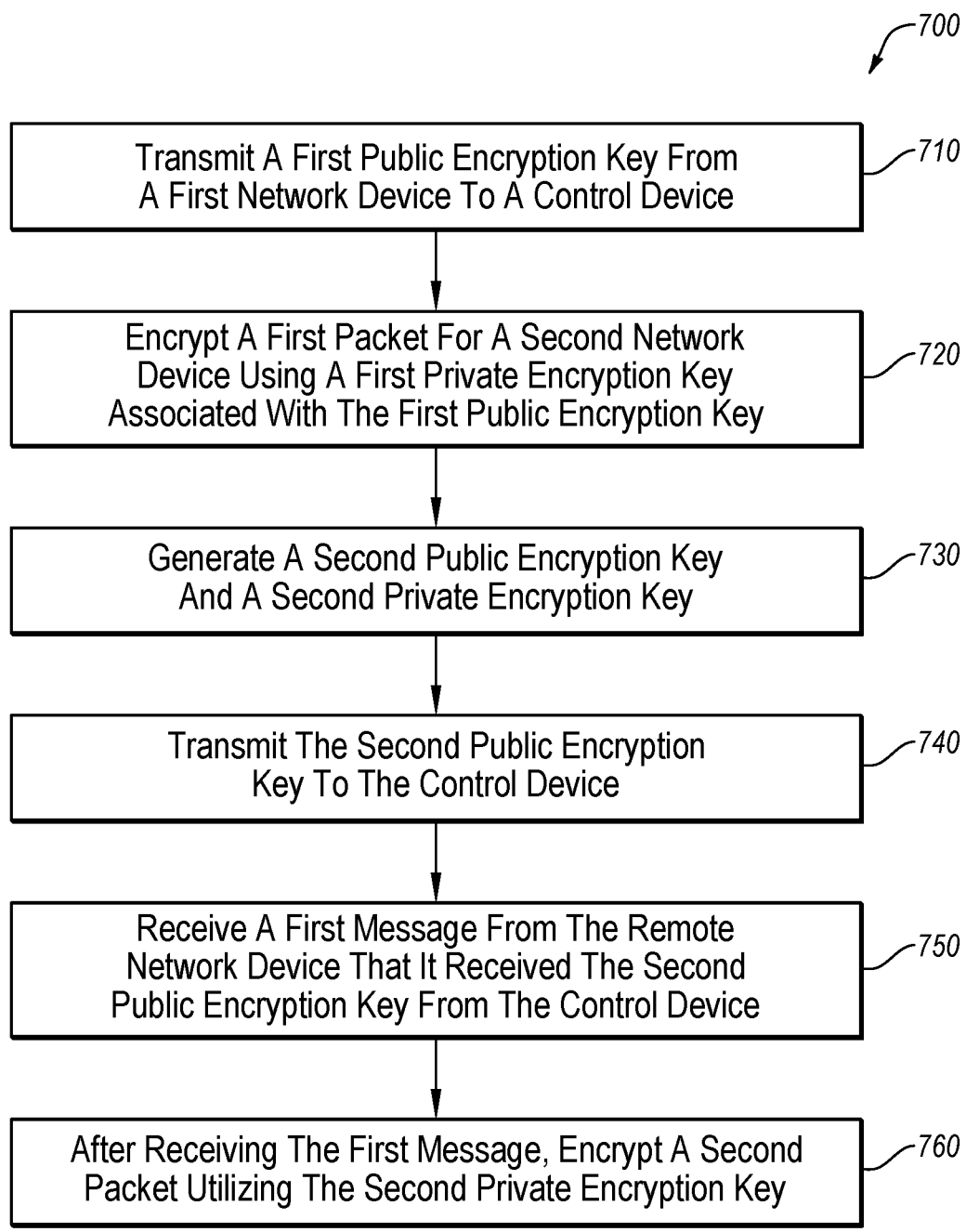
FIG. 7 illustrates a flowchart of an example method of secure network communication.

FIG. 7 illustrates a flowchart of an example method 700 of secure network communication, in accordance with one or more embodiments of the present disclosure. Although illustrated as discrete blocks, various blocks may be divided into additional blocks, combined into fewer blocks, or eliminated, depending on the particular implementation.

At block 710, a first public encryption key may be transmitted from a first network device (such as one of the edge network devices 110 of FIG. 1) to a control device (such as the control device 120 of FIG. 2). The first public encryption key may be associated with a first private encryption key, for example, for use in a Diffie-Hellman encryption technique.

At block 720, a first packet may be encrypted by the first network device for the second network device using at least the first private encryption key. The encrypted first packet may have transmitted from the first network device to the second device. Additionally, any number of packets may be encrypted and/or communicated between the first and second network devices at block 720.

At block 730, a second public encryption key and a second private encryption key may be generated. For example, the second public and private encryption keys may be configured to eventually replace the first public and private encryption keys. The second public and private encryption keys may replace the first public and private encryption keys after the first network device has confirmation that the second network device has received the second public encryption key. In some embodiments, the first network device may be configured to periodically generate a new set of public and private encryption keys for enhanced security. For example, the keys may be generated on the order of minutes, hours, or even days. For example, the keys may be generated every five minutes, every ten minutes, every thirty minutes, every hour, every two hours, every four hours, every twelve hours, every day, every two days, every week, or every month. In some embodiments, the frequency with which the keys rea generated may be correlated with the level of security such that an administrator may select how frequently keys are generated based on the particular application.

At block 740, the first network device may transmit the second public encryption key to the control device.

At block 750, a first message may be received by the first network device from the remote network device. The first message may indicate that the remote network device received the second public encryption key from the control device. For example, the control device may transmit the second public encryption key to the remote network device during a periodic distribution of public encryption keys. In some embodiments, even after transmitting the second public encryption key to the control device, the first network device may continue to encrypt packets utilizing at least the first private encryption key until the first network device receives the first message.

At block 760, after receiving the first message, the first network device may encrypt a second packet for the remote network device utilizing at least the second private encryption key.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 8A:
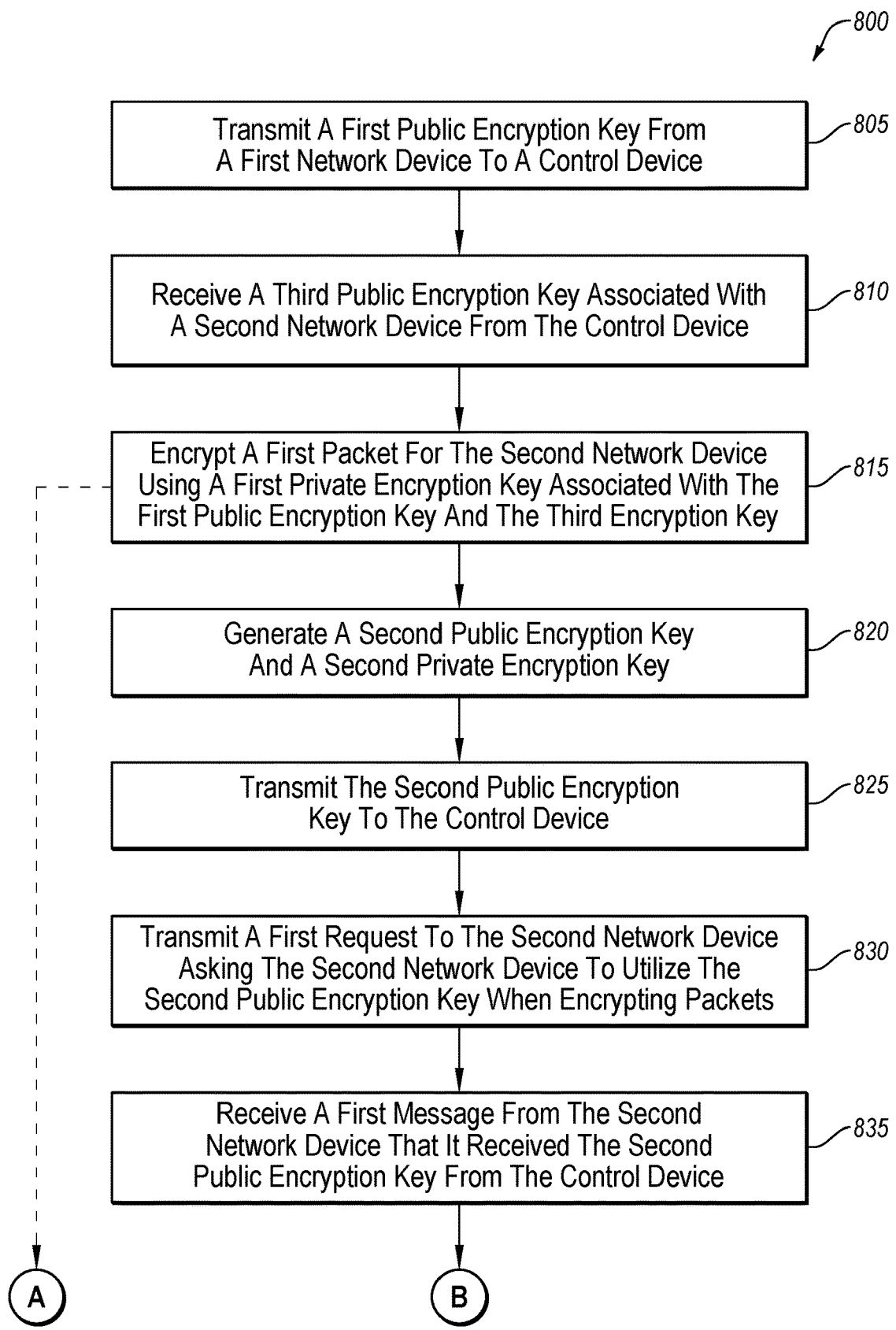
FIGS. 8A and 8B illustrate a flowchart of another example method of secure network communication.
Figure 8B:
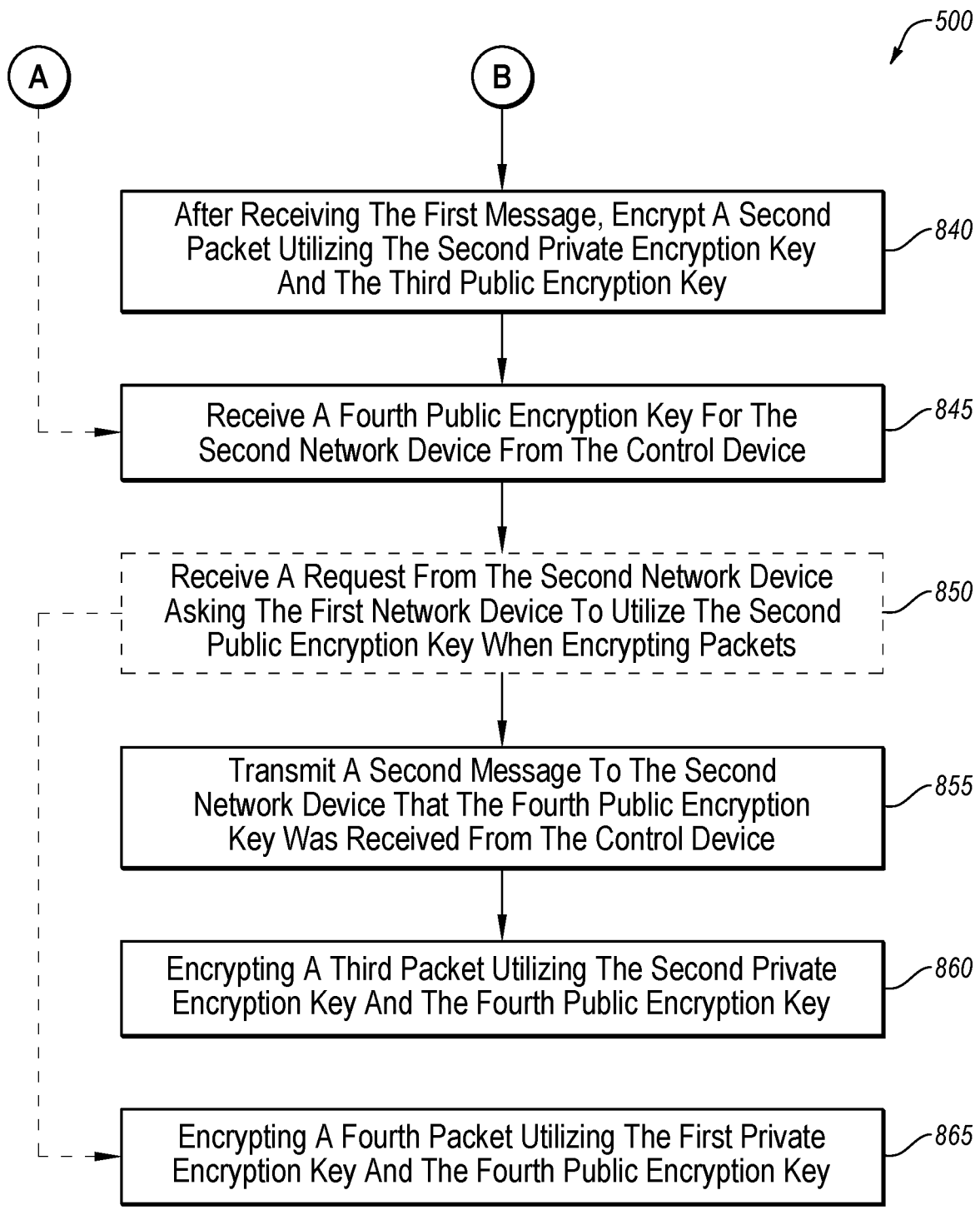

FIGS. 8A and 8B illustrate a flowchart of another example method of secure network communication, in accordance with one or more embodiments of the present disclosure. Although illustrated as discrete blocks, various blocks may be divided into additional blocks, combined into fewer blocks, or eliminated, depending on the particular implementation.

At block 805, a first public encryption key may be transmitted from a first network device (such as one of the edge network devices 110 of FIG. 1) to a control device (such as the control device 120 of FIG. 1). The first public encryption key may be associated with a first private encryption key. The first network device may utilize the set of the first private and public encryption keys in establishing and/or communicating with a second network device over a secure communication session.

At block 810, a third public encryption key associated with a second network device may be received from the control device. For example, the second network device may generate a third public encryption key and a third private encryption key and may provide the third public encryption key to the control device such that the control device may communicate the third public encryption key to the first network device.

At block 815, a first packet may be encrypted by the first network device for the second network device using the first private encryption key and the third public encryption key. In some embodiments, encrypting the first packet may include attaching a header to the first packet (such as a SPI) that identifies that the first private encryption key and the third public encryption key were utilized to encrypt the packet. The first packet may be sent from the first network device to the second network device.

At block 820, a second public encryption key and an associated second private encryption key may be generated.

For example, the first network device may be configured to periodically update the encryption keys used by the first network device.

At block 825, the first network device may transmit the second public encryption key to the control device.

At block 830, the first network device may optionally transmit a first request to the second network device asking the second network device to utilize the second public encryption key when encrypting packets. For example, the first network device may wait for a certain amount of time after transmitting the second public encryption key, and then may send the first request. The certain amount of time may be based on how frequently the control device distributes public encryption keys. Additionally, or alternatively, the first network device may periodically transmit the first request to the second network device after transmitting the second public encryption key. As another example, the first network device may transmit the first request in response to receiving a periodic distribution of public keys from the control device.

At block 835, a first message may be received by the first network device from the second network device. The first message may indicate that the second network device received the second public encryption key from the control device. The first message may include a SPI in an encrypted packet encrypted using the second public encryption key, an acknowledgment sent to the first network device in response to receiving the second public encryption key from the control device, an affirmative response sent in response to the first request of block 830, and/or any other communication between the first and second network device indicating receipt of the second public encryption key.

At block 840, after receiving the first message, the first network device may encrypt a second packet utilizing the second private encryption key and the third public encryption key. In other words, the first network device may transition or otherwise replace the first private encryption key with the second private encryption key.

At block 845, a fourth public encryption key for the second network device may be received by the first network device from the control device. For example, the second network device may generate the fourth public encryption key and an associated fourth private encryption key to update the third encryption key set. The second network device may provide the fourth public encryption key to the control device such that the fourth public encryption key will be included in the next distribution of public keys.

In some embodiments, the method 800 may proceed directly to the block 845 from the block 815. For example, the first network device may receive an updated public encryption key for the second network device without updating its own encryption key set.

At block 850, the first network device may optionally receive a request from the second network device asking the first network device to utilize the second public encryption key when encrypting packets. The block 850 may be similar or comparable to the block 830 with the roles of the first network device and the second network device reversed.

At block 855, a second message may be transmitted from the first network device to the second network device indicating that the fourth public encryption key was received from the control device. For example, the second message may include a packet (such as the third packet from block 860) with a header that indicates that the packet was encrypted using at least the fourth public encryption key. As another example, the first network device may transmit a dedicated message to the second network device.

At block 860, the first network device may encrypt a third packet for the second network device utilizing the second private encryption key and the fourth public encryption key.

In some embodiments, the method 800 may proceed from the block 855 to the block 865. At block 865, a fourth packet may be encrypted by the first network device utilizing the first private encryption key and the fourth public encryption key.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 9:
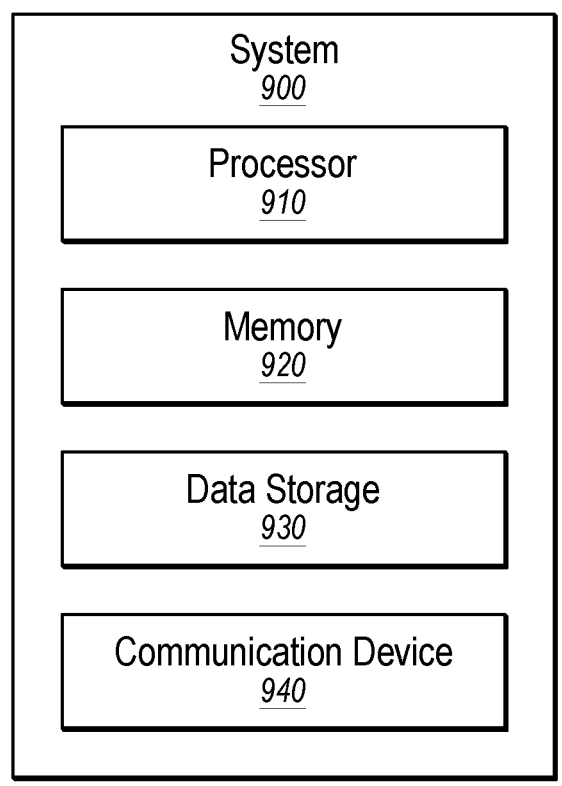
FIG. 9 illustrates an example computing system.

FIG. 9 illustrates an example computing system 900, according to at least one embodiment described in the present disclosure. The system 900 may include any suitable system, apparatus, or device configured to test software. The computing system 900 may include a processor 910, a memory 920, a data storage 930, and a communication unit 940, which all may be communicatively coupled. In some embodiments, any of the network devices (e.g., the edge network devices 110 of FIG. 1), network devices (e.g., the network devices 210, 220, 310, 320, 410, 420, 510, and/or 520 of FIGS. 2-5), control devices (e.g., the control devices 120, 230, 330, 430 or 530 of FIGS. 1-5), or other computing devices of the present disclosure may be implemented as the computing system 900. Additionally, or alternatively, one or more of the network devices, control devices, local computing devices or other computing devices may be implemented as virtualized machines operating on a physical computing system such as the computing system 900.

Generally, the processor 910 may include any suitable special-purpose or general purpose computer, computing entity, or processing device including various computer hardware or software modules and may be configured to execute instructions stored on any applicable computer-readable storage media. For example, the processor 910 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 9, it is understood that the processor 910 may include any number of processors distributed across any number of network or physical locations that are configured to perform individually or collectively any number of operations described in the present disclosure. In some embodiments, the processor 910 may interpret and/or execute program instructions and/or process data stored in the memory 920, the data storage 930, or the memory 920 and the data storage 930. In some embodiments, the processor 910 may fetch program instructions from the data storage 930 and load the program instructions into the memory 920.

After the program instructions are loaded into the memory 920, the processor 910 may execute the program instructions, such as instructions to perform the methods 700 and/or 800 of FIGS. 7 and 8, respectively. For example, the processor 910 may encrypt a packet using a first private encryption key. After generating a new private encryption key, the processor 910 may wait to encrypt a later packet with the new private encryption key until a message is received that a remote device has received a public encryption key corresponding to the new private encryption key.

The memory 920 and the data storage 930 may include computer-readable storage media or one or more computer-readable storage mediums for carrying or having computer executable instructions or data structures stored thereon. Such computer-readable storage media may be any available media that may be accessed by a general-purpose or special purpose computer, such as the processor 910. In some embodiments, the computing system 900 may or may not include either of the memory 920 and the data storage 930.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 910 to perform a certain operation or group of operations.

The communication unit 940 may include any component, device, system, or combination thereof that is configured to transmit or receive information over a network, such as an MPLS connection, the Internet, a cellular network (e.g., an LTE network), etc. In some embodiments, the communication unit 940 may communicate with other devices at other locations, the same location, or even other components within the same system. For example, the communication unit 940 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 940 may permit data to be exchanged with a network and/or any other devices or systems described in the present disclosure. For example, the communication unit 940 may allow the system 900 to communicate with other systems, such as network devices, control devices, and/or other networks.

Modifications, additions, or omissions may be made to the system 900 without departing from the scope of the present disclosure. For example, the data storage 930 may be multiple different storage mediums located in multiple locations and accessed by the processor 910 through a network.

As indicated above, the embodiments described in the present disclosure may include the use of a special purpose or general purpose computer (e.g., the processor 910 of FIG. 9) including various computer hardware or software modules, as discussed in greater detail below. Further, as indicated above, embodiments described in the present disclosure may be implemented using computer-readable media (e.g., the memory 920 or data storage 930 of FIG. 9) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   transmitting a first public encryption key from a local network device to a control device;
   encrypting a first packet for a remote network device utilizing a first private encryption key correlated with the first public encryption key;
   generating a second public encryption key and a second private encryption key;
   transmitting the second public encryption key from the local network device to the control device;
   receiving a first message from the remote network device at the local network device that the remote network device received the second public encryption key from the control device;
   and after receiving the first message from the remote network device that the remote network device received the second public encryption key, encrypting a second packet for the remote network device utilizing the second private encryption key;
   transmitting a request from the local network device to the remote network device asking the remote network device to use the second public encryption key, and the first message sent in response to the request;
   wherein transmitting the request is not performed until at least a distribution time has elapsed after transmitting the second public encryption key from the local network device to the control device, the distribution time including a periodic time duration of when the control device distributes one or more encryption keys to one or more network devices;
   wherein before the generating, the local network device uses the first private encryption key to encrypt packets for the remote network device;
   wherein between the generating and the receiving, the local network device is in possession of the first private encryption key and the second private encryption key, uses the first private encryption key to encrypt packets for the remote network device, and does not yet use the second private encryption key to encrypt packets for the remote network device;
   wherein in response to receiving the first message from the remote network device that the remote network device received the second public encryption key, the local network device stops using the first private encryption key to encrypt packets for the remote network device and transitions to the second private encryption key to encrypt packets for the remote network device.

2. The method of claim 1, further comprising:
   receiving a third public encryption key from the control device, the third public encryption key correlated with a third private encryption key, and wherein encrypting the first packet includes utilizing both the first private encryption key and the third public encryption key; receiving a fourth public encryption key from the control device to eventually replace the third public encryption key, the fourth public encryption key correlated with a fourth private encryption key; transmitting a second message to the remote network device that the local network device received the fourth public encryption key; and encrypting a third packet utilizing the first private encryption key and the fourth public encryption key before receiving the first message.

3. The method of claim 2, wherein the second message includes a header that at least identifies the first private encryption key and the fourth public encryption key and a payload included in the third packet encrypted utilizing the first private encryption key and the fourth public encryption key.

4. The method of claim 2, wherein the first message is received before transmitting the second message and encrypting the second packet includes utilizing both the second private encryption key and the fourth public encryption key.

5. The method of claim 2, wherein transmitting the second message includes transmitting an acknowledgment packet to the remote network device in response to receiving the fourth public encryption key from the control device.

6. The method of claim 1, further comprising:
   receiving a third public encryption key from the control device, the third public encryption key correlated with a third private encryption key; wherein encrypting the first packet includes utilizing both the first private encryption key and the third public encryption key; and wherein encrypting the second packet includes utilizing both the second private encryption key and the third public encryption key.

7. The method of claim 1, wherein receiving the first message includes receiving an acknowledgment packet.

8. The method of claim 7, wherein the first message is sent in response to the remote network device receiving the second public encryption key from the control device.

9. The method of claim 1, further comprising continuing to encrypt packets utilizing the first private encryption key until receiving the first message from the remote network device that the remote network device received the second public encryption key.

10. A non-transitory computer readable medium containing instructions that, in response to being executed by one or more processors, cause a local network device to perform operations, the operations comprising:
    transmit a first public encryption key from the local network device to a control device;
encrypt a first packet for a remote network device utilizing a first private encryption key correlated with the first public encryption key;
    generate a second public encryption key and a second private encryption key;
    transmit the second public encryption key from the local network device to the control device;
    receive a first message from the remote network device at the local network device that the remote network device received the second public encryption key from the control device for the remote network device; and
    after receiving the first message from the remote network device that the remote network device received the second public encryption key, encrypt a second packet utilizing the second private encryption key;
    transmit a request from the local network device to the remote network device asking the remote network device to use the second public encryption key, and the first message sent in response to the request;
    wherein transmitting the request is not performed until at least a distribution time has elapsed after transmitting the second public encryption key from the local network device to the control device, the distribution time including a periodic time duration of when the control device distributes one or more encryption keys to one or more network devices;
    wherein before the generate, the local network device uses the first private encryption key to encrypt packets for the remote network device;
    wherein between the generate and the receive, the local network device is in possession of the first private encryption key and the second private encryption key, uses the first private encryption key to encrypt packets for the remote network device, and does not yet use the second private encryption key to encrypt packets for the remote network device;
    wherein in response to receiving the first message from the remote network device that the remote network device received the second public encryption key, the local network device stops using the first private encryption key to encrypt packets for the remote network device and transitions to the second private encryption key to encrypt packets for the remote network device.

11. The computer readable medium of claim 10, the operations further comprising:
    receive a third public encryption key from the control device, the third public encryption key correlated with a third private encryption key, and wherein encrypting the first packet includes utilizing both the first private encryption key and the third public encryption key; receive a fourth public encryption key from the control device to eventually replace the third public encryption key, the fourth public encryption key correlated with a fourth private encryption key; transmit a second message to the remote network device that the local network device received the fourth public encryption key; and encrypt a third packet utilizing the first private encryption key and the fourth public encryption key before receiving the first message.

12. The computer readable medium of claim 11, wherein the second message includes a header that at least identifies the first private encryption key and the fourth public encryption key and a payload included in the third packet encrypted utilizing the first private encryption key and the fourth public encryption key.

13. The computer readable medium of claim 11, wherein encrypting the second packet includes utilizing both the second private encryption key and the fourth public encryption key.

14. The computer readable medium of claim 11, wherein transmitting the second message includes transmitting an acknowledgment packet to the remote network device in response to receiving the fourth public encryption key from the control device.

15. The computer readable medium of claim 10, the operations further comprising:
    receive a third public encryption key from the control device, the third public encryption key correlated with a third private encryption key; wherein encrypting the first packet includes utilizing both the first private encryption key and the third public encryption key; and wherein encrypting the second packet includes utilizing both the second private encryption key and the third public encryption key.

16. The computer readable medium of claim 10, wherein the operations cause the local network device to continue to encrypt packets utilizing the first private encryption key until the first message from the remote network device that the remote network device received the second public encryption key is received.

17. A system, comprising:
    a control device, the control device configured to receive and periodically distribute public encryption keys;
    a remote network device in communication with the control device;
    and a local network device in communication with the control device and in communication with the remote network device, the local network device configured to perform operations comprising:
    transmit a first public encryption key to the control device;
    encrypt a first packet for the remote network device utilizing a first private encryption key correlated with the first public encryption key;
    send the first packet to the remote network device;
    generate a second public encryption key and a second private encryption key;
    transmit the second public encryption key to the control device;
    receive a first message from the remote network device that the remote network device received the second public encryption key from the control device;
    and after receiving the first message from the remote network device that the remote network device received the second public encryption key, encrypt a second packet for the remote network device utilizing the second private encryption key;
    transmit a request from the local network device to the remote network device asking the remote network device to use the second public encryption key, and the first message sent in response to the request;
    wherein transmitting the request is not performed until at least a distribution time has elapsed after transmitting the second public encryption key from the local network device to the control device, the distribution time including a periodic time duration of when the control device distributes one or more encryption keys to one or more network devices;

wherein before the generate, the local network device uses the first private encryption key to encrypt packets for the remote network device;

wherein between the generating and the receiving, the local network device is in possession of the first private encryption key and the second private encryption key, uses the first private encryption key to encrypt packets for the remote network device, and does not yet use the second private encryption key to encrypt packets for the remote network device;

wherein in response to receiving the first message from the remote network device that the remote network device received the second public encryption key, the local network device stops using the first private encryption key to encrypt packets for the remote network device and transitions to the second private encryption key to encrypt packets for the remote network device.

18. The system of claim 17, wherein the remote network device receives the second public encryption key during a periodic distribution of public encryption keys, the periodic distribution including the second public encryption key.

* * * * *